United States Patent [19]

Van Ee

[11] Patent Number: 4,646,817

[45] Date of Patent: Mar. 3, 1987

[54] AIR TO AIR HEAT EXCHANGER

[75] Inventor: Dirk Van Ee, Humboldt, Canada

[73] Assignee: Del-Air Systems Ltd., Humboldt, Canada

[21] Appl. No.: 810,572

[22] Filed: Dec. 19, 1985

[51] Int. Cl.⁴ .................. F24F 1/02; F24H 9/06
[52] U.S. Cl. .................. 165/76; 165/122; 165/137; 165/164
[58] Field of Search ........... 165/137, 122, 916, 901, 165/DIG. 16, DIG. 2, 76, 164

[56] References Cited

U.S. PATENT DOCUMENTS

| | | | |
|---|---|---|---|
| 3,012,762 | 12/1961 | Norris | 165/137 X |
| 3,977,467 | 8/1976 | Northrup, Jr. | 165/137 X |
| 4,072,187 | 2/1978 | Lodge | 165/137 X |

FOREIGN PATENT DOCUMENTS 2006527  8/1971  Fed. Rep. of Germany ...... 165/137

*Primary Examiner*—S. J. Richter
*Attorney, Agent, or Firm*—Adrian D. Battison; Stanley G. Ade

[57] ABSTRACT

An air to air heat exchanger including a core structure defining two air paths and a pair of fans for drawing air through the core in the paths is formed by a frame structure defined by interlocking tubular frame elements and panels closing the faces defined by those frame elements. The panels are of different types providing simple closing panels, baffles, inlet and outlet ducts, fan support panels and others all of which are basically square for positioning in a face defined by the frame elements so that the heat exchanger construction can be tailored by positioning the various panel types where required.

10 Claims, 4 Drawing Figures

AIR TO AIR HEAT EXCHANGER

BACKGROUND OF THE INVENTION

This invention relates to an air to air heat exchanger and particularly to the structure and construction of a frame and panels therefor.

Heat exchangers of various types and constructions have been manufactured for many years but have recently become more important in view of increasing fuel costs. In many cases heat exchangers can be manufactured of a specific size and construction for a particular end use and can be shipped and installed as a single unit. Examples of such arrangements are domestic heat exchangers where the size of unit necessary for even larger houses is relatively small and a single design can satisfy many different housing requirements. A further example is provided by wall mounted units which can be used in livestock barns and the like and again a single unit can be used to satisfy many different requirements with further wall mounted units being applied if necessary at different locations in the barn.

Larger systems for example for apartments, workshops and hotel or conference facilities often require a central system which is ducted to various different locations in the building. In such a case the unit may be of a size which is inconvenient to ship in assembled form and in addition the large variations in requirements may make a single design unsatisfactory since it cannot accommodate the different possible end uses.

SUMMARY OF THE INVENTION

It is one object of the present invention, therefore, to provide an improved structure of air to air heat exchanger which enables ready assembly of the heat exchanger and variations in the construction thereof to accommodate different design requirements.

According to the invention, therefore, there is provided an air to air heat exchanger comprising a frame structure including a plurality of straight frame elements and means for interlocking the frame elements at right angle corners to form a frame defining on each side thereof, a plurality of separate rectangular faces, each bounded by four such frame elements and defining a plurality of cells each having six such faces, a core structure defining first and second separate air paths therethrough in heat exchanging air impervious relationship, said core structure being mounted in at least one of said cells and a plurality of panels each adapted to fit sealingly in a single face of said frame structure, at least four of said panels each having an opening therein whereby the four panels form respectively an inlet and outlet for said first path and an inlet and outlet for said second path.

With the foregoing in view, other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
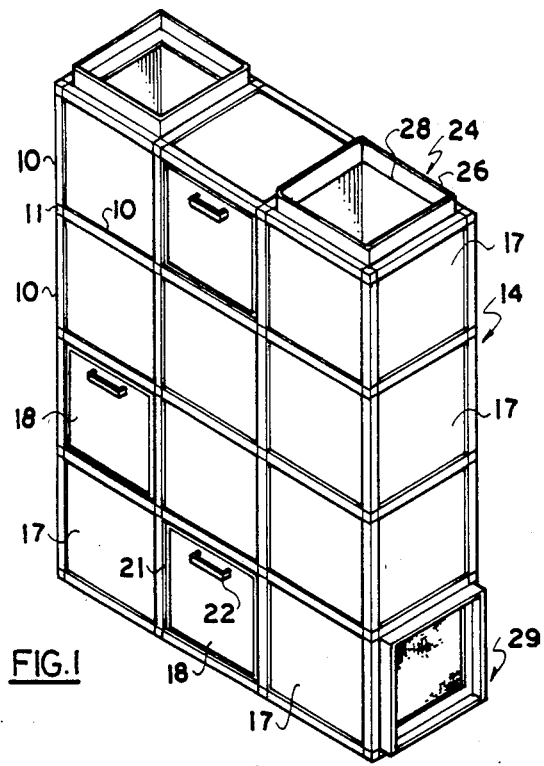
FIG. 1 is an isometric view showing the exterior of a heat exchanger according to the invention.

A heat exchanger comprises a generally rectangular frame formed to define a plurality of individual cells. Specifically the frame structure is formed from a plurality of frame elements 10 arranged to interlock at right angle corner members 11 one of which is shown in more detail in FIG. 3. This arrangement forms a rectangular cell construction with three columns of four cells each making a total of twelve cells each of which is a cube as all of the frame elements 10 are of the same length.

Each of the frame elements comprises a square section tube cut from an extrusion preferably of aluminum or similar material. The corner members 11 are of a commercially available type which defines a central block 12 against which the ends of the tubes 10 about together with a number of arms 13 each of which projects into a respective tube or frame element as a press fit or as a lock fit to hold the frame elements mutually at right angles. The corner members 11 are available with varying numbers and arrangements of arms as required for the different locations in the frame as it will apparent from a simple study of the structure. In some cases a simple plastics extension arm 13 can be suitable which is simply press fit into the tubular frame element. However, more rigid structures can be obtained by a system commercially available from Beautiline Systems Ltd. of Downsview Ontario by which rotation of a tube element through 90° causes a locking movement so that the tubular element is retained more rigidly on the corner member 11.

Figure 3:
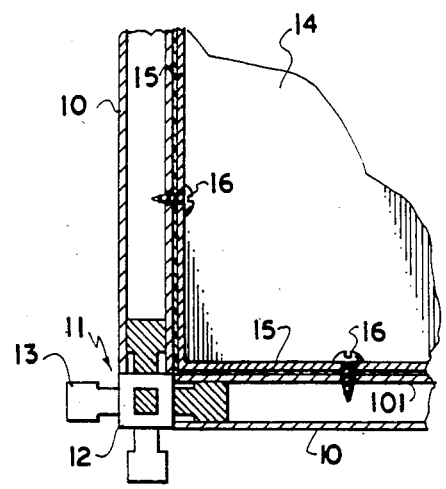
FIG. 3 is a cross sectional view on an enlarged scale of a junction between two frame elements and the associated panel therebetween.

In order to complete the heat exchanger and the frame structure, a plurality of panels is arranged with each fitted in a face of the cell defined by four such frame elements. Each panel has a square front face generally indicated at 14 and four flanges 15 which are turned at right angles to the front face so as to extend rearwardly into the area between the frame elements. The flanges 15 as shown best in FIG. 3 are screwed to the frame elements by screws 16 which pass through the flange and engage a drilled hole in the frame element 10 particularly on an inside face of the square tubing indicated at 101. Between the flange 15 and the face 101 is mounted a gasket 17 of thin rubber or the like by which the structure is given resilience and by which vibration between the different components is damped. Various different types of panels are provided as will be explained hereinafter but each is mounted in the manner shown in most detail in FIG. 3.

A basic panel indicated at 18 comprises simply a plain sheet which closes the area between the frame elements. A second type of panel indicated at 18 includes an access door. The access door is square and only slightly smaller than the basic panel with outside flanges 19 (see FIG. 4) for cooperating with inner flanges 20 of the access door panel 21. The access door includes a handle 22 which can be actuated to lock or release the access door and pivots on pins 23 arranged at the bottom of the door for cooperation with side edges of the access door panel portion 21.

Figure 2:
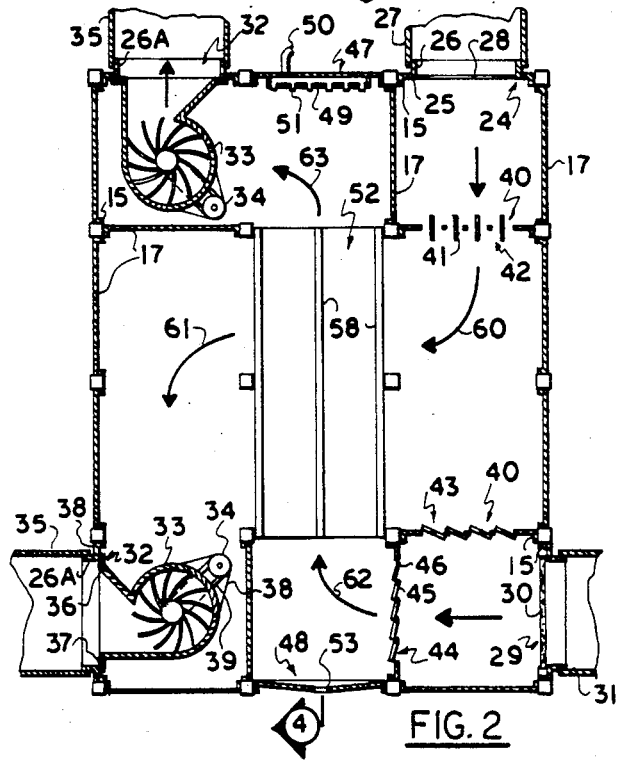
FIG. 2 is a longitudinal cross sectional view of the heat exchanger of FIG. 1.

A third type of panel is indicated at 24 in FIGS. 1 and 2 and comprises an inlet panel having flanges for attachment to a square feed duct particularly of clean outside air. Thus the panel 24 comprises the flange 15 as previously explained, a narrow surrounding strip portion 25 at right angles to the flange 15 and an upstanding flange 26 for receiving in close fit the walls of a square duct 27. The remainder of the panel centrally of the flanges 26 is of course open as indicated at 28 so that the inlet air from the duct 27 can pass into the heat exchanger.

A further type of panel indicated at 29 is of basically the same construction as the panel 24 but also it includes a filter screen 30 mounted in an area between the flanges 15 for filtering stale exhaust air taken from inside the building through a duct 31, the filter acting to extract impurities from the air prior to passage of the air through the core as is described hereinafter to avoid deposit of the impurities on the core.

A further type of panel is indicated at 32 and carries a fan 33 and motor 34. The fan as shown in the top left hand and bottom left hand cells of FIG. 2 comprises a centrifugal type fan of generally conventional design and shown schematically. The panel 32 provides a flange 26A similar to the flange 26 of the panel 24 for receiving an outlet duct 35. Inside the flange 26A, the panel provides an inwardly extending surrounding rim portion for receiving a mounting flange 36 of the fan housing with a gasket 37 between the flange 36 and the inwardly projecting surrounding rim portion indicated at 38, the gasket providing sound deadening and vibration dampening properties. The fan housing is therefore mounted wholly upon the panel 32 and in turn the motor 34 is support upon a bracket 38 schematically indicated and attached to the fan housing. The fan is driven by a belt 39 from the motor so that air drawn in through the ends of the fan axially thereto is ejected through the opening defined inside the surrounding rim portion 38 into the duct 35.

A yet further panel type generally indicated at 40 in FIG. 2 comprises a motorized damper panel which carries moveable flaps 41 which can be turned from an open position indicated generally at 42 to a closed position indicated generally at 43. These flaps can be actuated by a suitable motor mechanism (not shown).

A still further panel type indicated at 44 comprises a back draft damper in which a plurality of flaps 45 depend downwardly from hinge points 46 so that they can be opened by movement of the air in an intended direction and are closed by movement of air in the opposite direction to prevent a back draft. It will be appreciated that the panels 40 and 44 are of course constructed in the same manner as the basic panels with the necessary interconnections and support for the flaps as will be apparent to one skilled in the art.

Yet further panels are indicated at 47 and 48 and comprise respectively water injection panels and drain panels. A construction of the basic panel is as previously described. The water injection panel 47 provides a manifold 49 for attachment to a hose supply 50 of water or suitable cleaning agent and a plurality of nozzles 51 for directing the water onto the core generally indicated at 52. The drain panel 48 has a central opening 53 and is indented slightly so that water runs from the core to the opening 53 for suitable collection.

Figure 4:
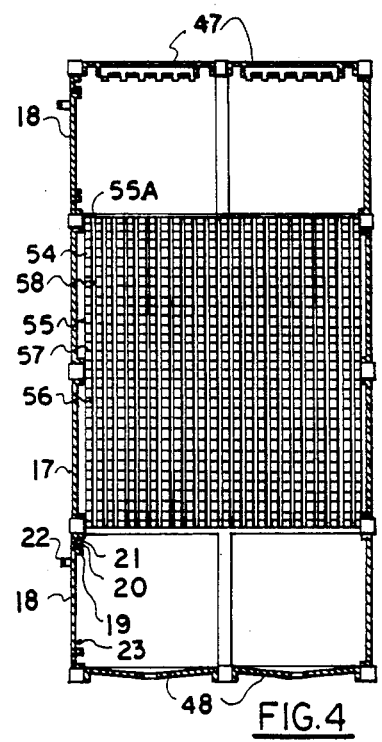
FIG. 4 is a transverse cross section view of a heat exchanger of similar construction to that of FIG. 1 but of increased width to provide greater airflow capacity.

The core fills the two central cells and is of the type described in more detail in U.S. Pat. No. 4,512,392 (Benning and Van Ee), (Canadian Pat. Nos. 1,177,821 and 1,179, 323). The core is formed from Coroplast (trademark) sheets which are a polypropylene extrusion shown best in FIG. 4. Each extrusion generally indicated at 54 comprises a pair of plastic sheets 55, 56 interconnected by transverse dividers 57 forming small square cells longitudinally of the sheet through which air can pass. Each extrusion 54 is separated from a next adjacent extrusion by spaces 58 so that air can pass between the sheet 56 of a first extrusion and the adjacent sheet indicated at 55A of the next extrusion in the construction of the core. As shown in FIGS. 2 and 4, the core is constructed with the extrusions arranged in vertical planes and so that the small cells run in a horizontal direction. Thus the wider areas defined between the widely spaced spacers 58 run in a vertical direction also divided by the vertical planes of the extrusions. As shown best in FIG. 2, the spacers 58 are arranged only at widely spaced points for example at the extreme edges of the core and possibly with one additional space centrally depending upon strength and design requirements.

In operation of the core shown particularly in FIG. 2, air is drawn from outside of the building that is clean cold air through the duct 27 downwardly into the upper right hand cell through the normally open baffle plate 42 and into the small cells of the core. The normally closed baffle plate 43 prevents the air from passing further downwardly so the air has to turn through a right angle into the core as indicated by the arrow 60. Downstream of the core, the air is confined by the plane panels 17 to turn downwardly as indicated by the arrow 61 to the fan 33 which causes the movement of the air in the path as described and ejects the air into the duct 35 for communication into the building through conventional duct work.

An exhaust path of air under a motor force from the fan 33 in the upper left hand cell moves from the duct 31 through the filter 30 and through the back draft damper 44 to turn as indicated at 62 into the wider channels of the core. After moving vertically through the core, the air turns as indicated at 63 towards the fan 33 for ejection into the duct 35.

In order to provide de-icing of the core, the baffles 42 and 43 can be operation for example by a timer so that when a de-icing cycle is required, the baffle 42 is closed and the baffle 43 opened so that warm exhaust air is drawn through the core in both paths of the core as explained in more detail in the above Patents.

The above layout of the fans and various panels is of course only one possible design. It will be appreciated that, in accordance with requirements of the ducting and necessary airflows, the layout can be modified or enlarged as required simply by locating the various panel types at different positions in the frame construction.

The construction of frame formed by the frame elements and panels can therefore be supplied in assembled form or as a kit of parts for assembly on site. In addition the construction can be specifically tailored to requirements with a design being provided either by the supplier or by a user.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An air to air heat exchanger comprising a frame structure including a plurality of straight frame elements and means for interlocking the frame elements at right angle corners to form a frame defining on each side thereof, a plurality of separate rectangular faces, each bounded by four such frame elements and defining a plurality of cells each having six such faces, a core structure defining first and second separate air paths therethrough in heat exchanging air impervious relationship, said core structure being mounted in at least one of said cells and a plurality of panels each adapted to fit sealingly in a single face of said frame structure, at least four of said panels having opening therein whereby the four panels form respectively an inlet and outlet for said first path and an inlet and outlet for said second path.

2. The invention according to claim 1 wherein at least one of said four panels includes flange means thereon outstanding therefrom and surrounding the opening for attachment to a duct carrying air to or from said heat exchanger.

3. The invention according to claim 1 wherein at least two of said panels each support a fan for moving air in one of said first and second paths, said panel having an opening therein and said fan having a casing attached to said panel around said opening.

4. The invention according to claim 1 wherein one of said panels supports filter means for positioning in one of said first and second paths.

5. The invention according to claim 1 wherein at least one of said panels supports damper means movable to allow air through an opening in the panel and to halt passage of air through said opening in the panel.

6. The invention according to claim 1 wherein a plurality of said panels support access doors such that opening of said doors provides an opening in a side of said heat exchanger for access to the interior thereof.

7. The invention according to claim 1 wherein each frame element defines an inside surface facing inwardly toward an opposed frame element and wherein each panel is fixed to the frame elements on said inside surface.

8. The invention according to claim 7 wherein the frame elements are formed from square tubing and wherein each panel has around four sides thereof a flange at right angles to the plane of the panel for screwed attachment to said inside surface.

9. The invention according to claim 1 wherein the core is sized to fit exactly in a whole number of cells.

10. The invention according to claim 9 wherein, viewed from the side, said frame structure is formed of twelve cells arranged in three rows of four cells each with the core filling two central cells in the central row.

* * * * *